United States Patent Office.

BIRD PAINE, OF McMINNVILLE, TENNESSEE.

Letters Patent No. 70,602, dated November 5, 1867.

IMPROVED MEDICAL COMPOUND.

*The Schedule referred to in these Letters Patent and making part of the same.*

TO ALL WHOM IT MAY CONCERN:

Be it known that I, BIRD PAINE, of McMinnville, in the county of Warren, in the State of Tennessee, have invented a new and improved Recipe for an Anti-Fever and Tonic Pill, for the cure of fever in all its classes and stages; and I do hereby declare that the following is a full and exact description thereof.

R—Sulphate of quinine, one ounce; extract liquorice, pulverized, six drachms; gum-myrrh, pulverized, two drachms; ipecacuanha, pulverized, eighty grains; essential oil of sassafras, twenty drops. Mix thoroughly, and make into a mass with water for making pills. Divide the mass into four hundred and eighty pills of equal size.

What I claim as my invention, and desire to secure by Letters Patent, is—

The combination of pulverized ipecacuanha with the other remedies as described above, whereby the well-known deleterious effects of quinine in large doses are prevented, and the aggregate healing properties of the combination greatly enhanced.

BIRD PAINE.

Witnesses:
   P. H. COFFEE,
   J. L. THOMPSON.